United States Patent
Okamoto (10) Patent No.: US 6,585,431 B1
(45) Date of Patent: Jul. 1, 2003

(54) NONCONTACT INFORMATION TRANSMITTER

(75) Inventor: Kazuo Okamoto, Hirakata (JP)

(73) Assignee: Matsushita Electric Industrial Co., Ltd. (JP)

(*) Notice: Subject to any disclaimer, the term of this patent is extended or adjusted under 35 U.S.C. 154(b) by 0 days.

(21) Appl. No.: 09/320,526

(22) Filed: May 26, 1999

(30) Foreign Application Priority Data

May 26, 1998 (JP) .......................................... 10-143877

(51) Int. Cl.[7] .............................................. H04B 10/02
(52) U.S. Cl. ...................... 398/131; 398/129; 398/118; 398/156
(58) Field of Search ................................ 359/152, 154, 359/159, 157

(56) References Cited

U.S. PATENT DOCUMENTS

| | | | | |
|---|---|---|---|---|
| 4,908,823 A | * | 3/1990 | Haagens et al. | ............ 340/2.25 |
| 5,321,542 A | * | 6/1994 | Freitas et al. | ................ 359/113 |
| 5,485,488 A | | 1/1996 | Van Brunt et al. | .......... 375/257 |
| 5,617,236 A | * | 4/1997 | Wang et al. | ................. 359/137 |

FOREIGN PATENT DOCUMENTS

| | | | | |
|---|---|---|---|---|
| JP | 06289955 A | | 10/1994 | |
| JP | H10055231 A | | 2/1998 | |
| JP | 11168436 A | * | 6/1999 | ......... H04B/10/105 |
| JP | 2000224256 A | * | 8/2000 | ........... H04L/29/06 |
| WO | WO 02/073836 A1 | * | 9/2002 | ........... H04B/10/10 |

OTHER PUBLICATIONS

Matsuda et al. "IEEE1394 S200 Infrared Wireless Adapter," International Conference on Consumer Electronics, 1999, pp. 288–289.*

Matsuda et al. "125 Mbps IR Wireless Link for IEEE11394 Multimedia Home Network," 24th European Conference on Optical Communication, Sep. 20–24, 1998, vol. 1, pp. 343–344.*

Nishimaki et al. "A study for the Optical Wireless based on IEEE1394," International Conference on Consumer Electronics, 2000, pp. 202–203.*

* cited by examiner

Primary Examiner—Leslie Pascal
Assistant Examiner—Christina Y Leung
(74) Attorney, Agent, or Firm—Rossi & Associates (57) ABSTRACT

The invention solve the problems, such as imperfect connection and transmission error in the connector between the personal computer or other information appliance and the docking unit for its function expansion, and lowering of reliability in the contact portion of the connector by repeated insertion and pulling out, or lowering of reliability in the contact portion due to vibration, salt, or moisture. As the means of solving the problems, a serial signal of USB or IEEE1394 is converted into a signal for optical transmission, and it is transmitted, without making contact, between an emitter 52A and a receiver 52B disposed oppositely across a spatial gap. The transmission routes are prepared in two lines, and full duplex transmission is realized. Therefore, signals are connected and disconnected easily, and anytime, and a highly reliable transmission is realized.

8 Claims, 10 Drawing Sheets

NONCONTACT INFORMATION TRANSMITTER

FIELD OF THE INVENTION

The present invention relates to a noncontact information transmitter for transmitting information between an information appliance such as a notebook personal computer or a portable information terminal and an appliance connected for expanding the function of such information appliance.

BACKGROUND OF THE INVENTION

Portable information terminals, such as various notebook personal computers (hereinafter called notebook PC), a personal digital assistant (PDA) and a personal intelligent communicator (PIC), have recently come into widespread use. These information appliances (or information processing devices) are designed mainly for the purpose of portable use, and when expanding their functions, they are often connected to function expansion devices such as a docking station, a docking unit, a port replicator, and an expansion box. The information appliance, such as the notebook PC, and the function expansion device are physically connected by terminal or the like, and information is transmitted between the devices by the physical connection.

The function expansion devices include a hard disk device, a CD-ROM device, a CR-R device, a PD device, a DVDROM device, a DVDRAM device, other external memory devices, a board mounting CRT display circuit, a board mounting a circuit to be connected to a network, a board mounting a modem circuit to be connected to a telephone circuit, and a board mounting a circuit to extend the signal. A peripheral device can also be connected to the function expansion device. Some of the function expansion devices have a function of supplying power to the notebook PC, built-in peripheral device, an externally connected peripheral device, or built-in circuit board.

Hitherto, as the function expansion device of personal computer, a detachable information processing device as disclosed in Japanese Laid-open patent No. 6-289955, and many others have been known. In such detachable information processing device, a power source is cut off when connecting and manipulating the transmission route, and the power source is turned on after connection, or when cutting off the connection of the detachable information processing device by pressing the eject button, it is necessary to cut off connection after turning off the power source, but the invention is intended to be manipulated by the operator without considering on or off of power source when detaching or attaching.

In the following explanation, the expansion box, docking station, docking unit, and port replicator are commonly called the function expansion device.

Figure 11:
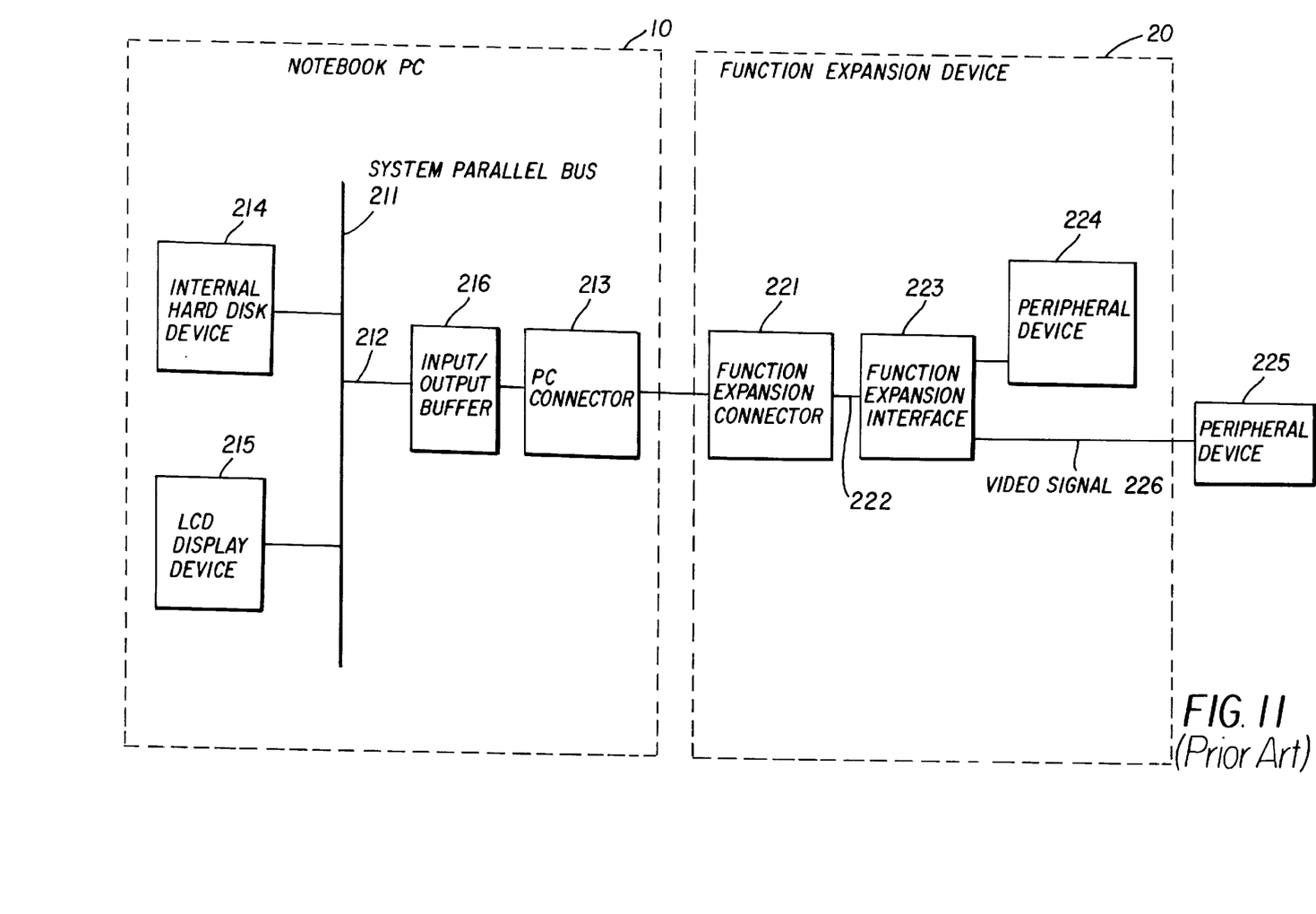
FIG. 11 is a block diagram showing a structural example of a conventional information transmitter.

A constitution of a conventional function expansion device is shown in FIG. 11. In FIG. 11, the notebook PC 10 and function expansion device 20 are connected by connecting the mutual connectors.

Inside the notebook PC 10, system parallel buses 211 are provided. The system parallel buses 211 refer, for example, to 32-bit peripheral component interconnect bus (PCI bus), 16-bit industry standard architecture bus (ISA bus), etc. Of the system parallel buses 211, a signal necessary for function expansion (hereinafter function expansion signal) 212 is connected to the PC connector 213 through an input and output buffer 216. The system parallel buses 211 are connected to the internal hard disk device 214 and LCD display device 215.

Inside the function expansion device 20, a function expansion connector 221 and function expansion interface 223 are provided. The function expansion connector 221 is connected to the function expansion interface 223 composed of LSI and circuit, through a function expansion signal 222. The function expansion interface 223 is connected to a peripheral device 224 provided in the function expansion device 20 and a peripheral device 225 provided outside the function expansion device 20. More specifically, the peripheral device 224 is a hard disk drive device or data backup device of high speed and large capacity, and the peripheral device 225 is a camera, printer, or the like.

The operating principle is briefly described below. The notebook PC 10 has basic functions of personal computer alone, and is portable, and is hence used anywhere. On the other hand, the function expansion device 20 has a fixed environmental peripheral device inside or outside by wiring, and it does not function alone, but when connected with the notebook PC 10, it enhances the function of the notebook PC 10 so as to function by processing at larger capacity and higher speed. The notebook PC 10 is connected electrically to the function expansion device 20 through the PC connector 213 and function expansion connector 221. The data stored in the built-in hard disk device 214 is put into the function expansion connector 221 as function expansion signal 212 through system parallel bus 211 and PC connector 213, and, for example, the data is backed up in the peripheral device 224 which is a data back-up device through the function expansion interface 223. On the other hand, a video signal 226 entering from a peripheral device 225 containing a camera passes through the function expansion interface 223, and is reproduced as a camera image in the LCD display device 215 by way of the function expansion connector 221, PC connector 213 and system parallel bus 211.

In the embodiment shown in FIG. 11, the notebook PC 10 and function expansion device 20 are electrically connected to each other. Accordingly, when connecting or disconnecting the notebook PC 10 and function expansion device 20, it was necessary to connect or disconnect after once turning off the power source of the notebook PC 10 and the power source of the function expansion device 20.

To eliminate this inconvenience, a detachable information processing device is disclosed in Japanese Laid-open Patent No. 6-289955. It is intended to turn off the power source automatically by detecting the connecting or disconnecting operation. It is briefly described below while referring to FIG. 12.

Figure 12:
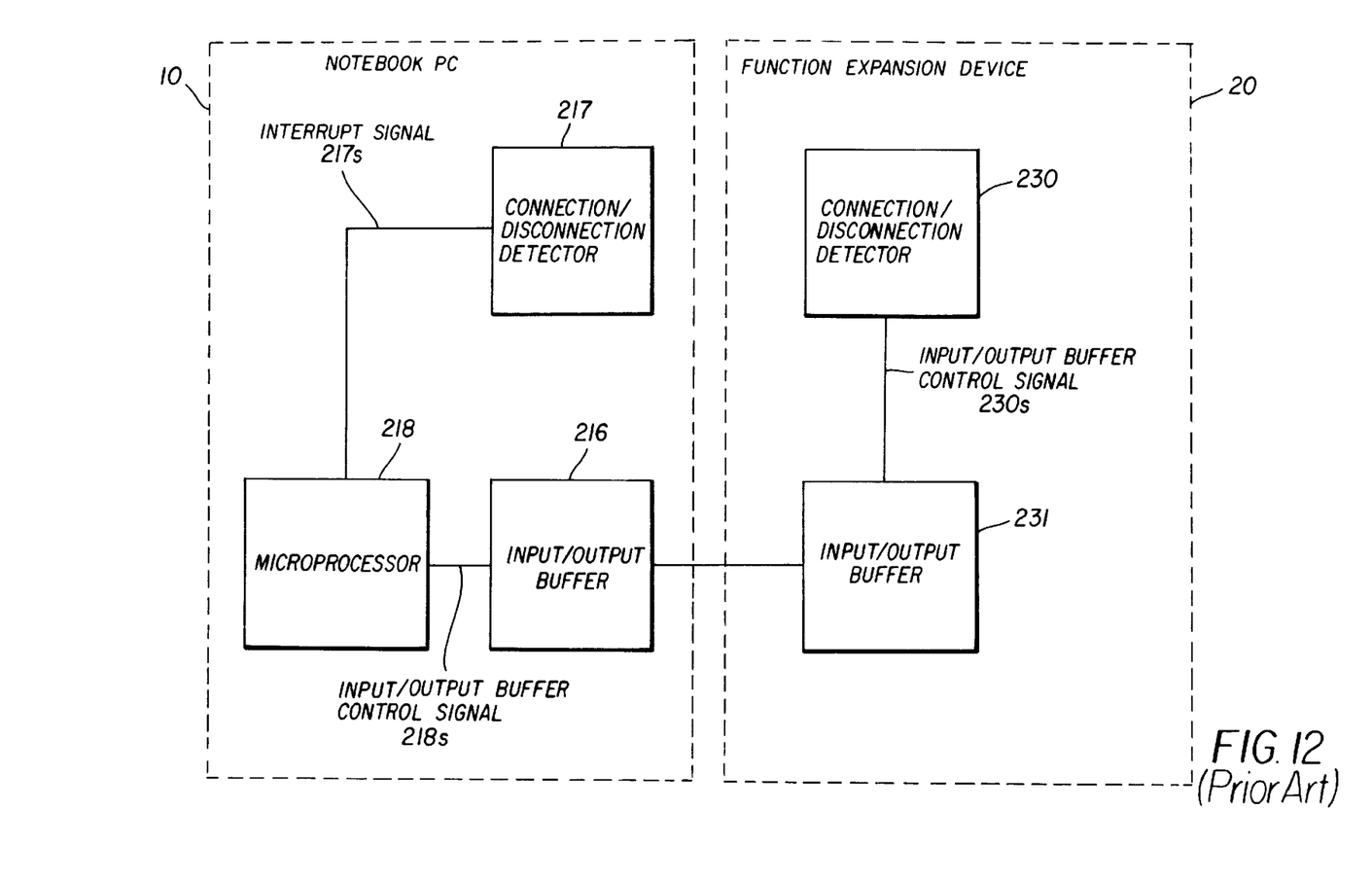
FIG. 12 is a block diagram showing other structural example of a conventional information transmitter.

In FIG. 12, the notebook PC 10 and function expansion device 20 are connected electrically between the input and output buffers 216 and 231. Depending on connection or disconnection of the input and output buffers 216, 231, a tri-state or open state is established. To realize this, by an interrupt signal 217s emitted from a connection/disconnection detecting device 217, interrupt processing is carried out in a microprocessor 218, and the input and output buffer 216 is set in tri-state by the input and output buffer control signal 218s. Similarly, inside the function expansion device 20, by the input and output buffer control signal 230s emitted from the connection/disconnection detecting device 230, the input and output buffer 231 is set in tri-state or open state. Hence, it is possible to attach or detach without being conscious of power feed or cut-off state.

In this method, the internal processing of the notebook PC 10 may be continuous, and from the viewpoint of software, it does not guarantee the entire operation of the application software.

To improve this point further, U.S. Pat. No. 5,485,488 is disclosed. It is characterized by using the serial interface system called the IEEE1394. In other example, it is also attempted to connect by using universal serial bus (USB). These examples are explained in FIG. 13.

Figure 13:
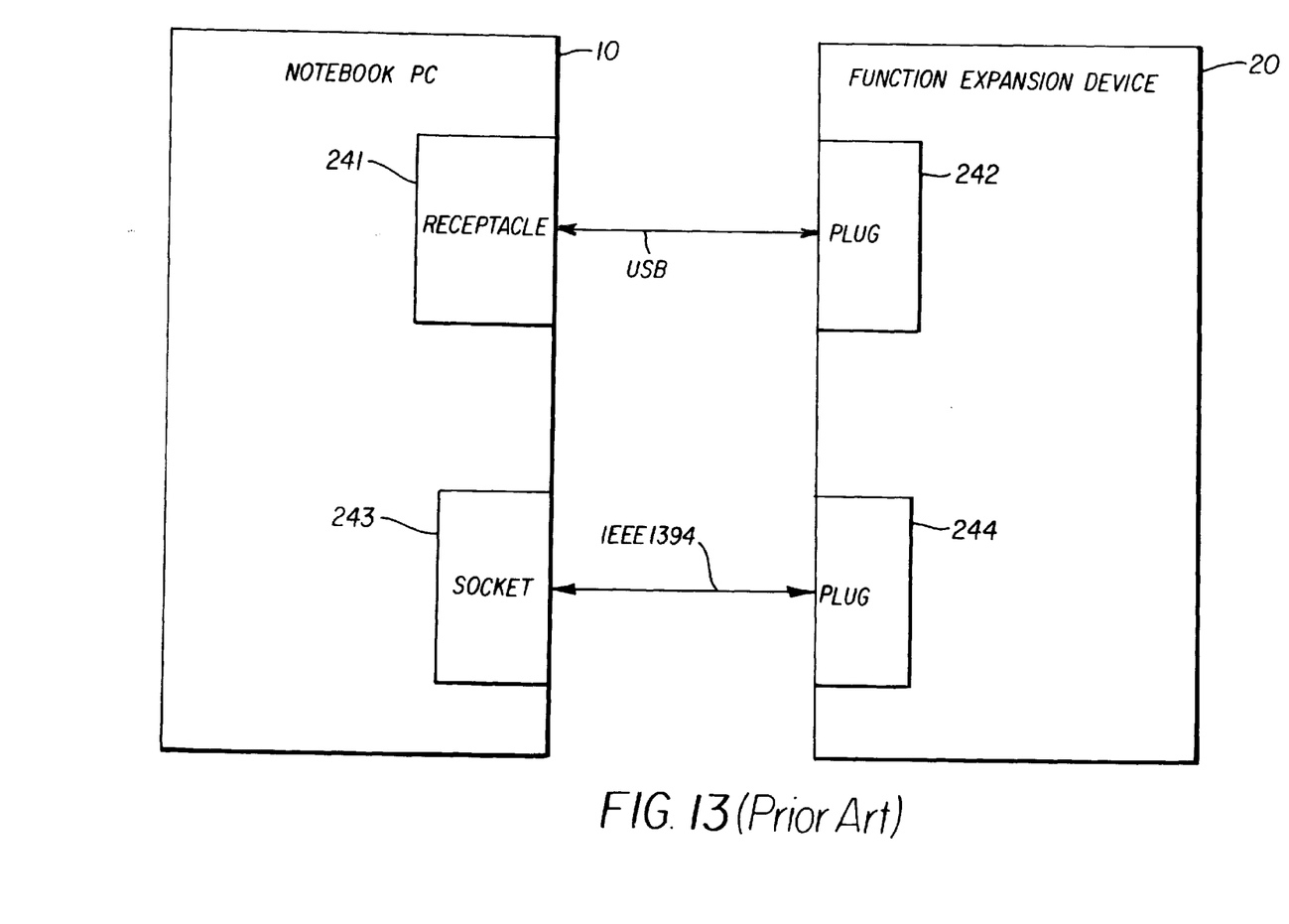
FIG. 13 is a block diagram showing a different structural example of a conventional information transmitter.

In FIG. 13, the connector of USB is connected at the contact point(s) by means of a receptacle 241 fitted to the notebook PC 10 side and a plug 242 fitted to the function expansion device 20 side. The connector of IEEE1394 is connected at the contact point(s) by means of a socket 243 fitted to the notebook PC 10 side and a plug 244 fitted to the function expansion device 20 side. In the IEEE1394 and USB, by using a twist pair, it is intended to connect plural devices by serial bus. More specifically, the IEEE394 is intended to supply two pairs of power source and signal line to the function expansion device 20, and the USB is intended to supply one pair of power source and signal line to the function expansion device 20.

Both IEEE1394 and USB are known as device bay, and if disconnected during data transmission, or if connected while the power is supplied, it has no effect on the processing action of the PC main body from the viewpoint of hardware and software, and the application software proceeds normally, having no effects on other tasks.

In the conventional device, however, the following problems were known.

First, in the case of parallel bus connection between the notebook PC 10 and function expansion device 20 shown in FIG. 11, it is necessary to use 100-pin connector or 200-pin connector as the connector for connection, and an imperfect connection may occur at the time of connection, and there were problems in reliability such as runaway of the notebook PC 10 during operation. Moreover, because the connection is mechanical, there was a finite life cycle associated with inserting and pulling out the connection. For example, in this kind of connector, the life of inserting and pulling out is about 2000 times, and if inserted and pulled out 10 times/day, it corresponds to 200 days, and it was guaranteed only for a year.

In the constitution shown in FIG. 12, the manipulation for once turning off the power source of the device can be solved, but from the viewpoint of the software, all operations of the application software were not guaranteed. That is, while the application software is in process, it is not allowed to connect or disconnect anytime by force.

The embodiment shown in FIG. 13 can solve the problem of the software, but because of mechanical connection, too, there was also life in inserting and pulling out. For example, according to the USB specification, the minimum life of inserting and pulling out the receptacle and plug is specified as 1500 times. Also according to the IEEE1394 specification, the minimum life of inserting and pulling out the socket and plug is specified as 1500 times. Actually, at a maximum possibility, the life of inserting and pulling out is about 5 times as large, that is, 7000 times. Supposing to be inserted and pulled out 10 times/day and used for 200 days/year, the life is about three years and a half, which is not sufficiently considering the service life of general products is about 6 or 7 years.

Besides, together with the portable information device, the portable function expansion device must be considered, and the mechanical connector not withstanding vibration or humidity involves problems in the aspect of reliability of the appliance.

Also in the case of mechanical connection, when the connector is detached or attached in the power source connected state, the information portable terminal device or function expansion device may be broken down or malfunction due to spark or static electricity.

SUMMARY OF THE INVENTION

It is hence an object of the invention to solve the aforesaid problems, and more particularly to present a noncontact information transmitter capable of being detached or attached without being conscious of the state of the power source or software, long in the life of insertion and pulling out, and high in reliability.

To achieve the object, the invention comprises electric signal/optical signal converting means for converting a serial signal into a signal for optical transmission, light emitting and receiving means for transmitting the output of the electric signal/optical signal converting means through a spatial gap, optical signal/electric signal converting means for converting the signal from the receiving means to an electric signal, and serial signal reproducing means for reproducing the output of the optical signal/electric signal converting means into a serial signal.

The serial signal conforms to USB or IEEE1394. It further comprises a spatial transmission core for supplying electric power.

Accordingly, it realizes a noncontact information transmitter capable of transmitting information without using mechanical connection, and connecting and disconnecting without being conscious of the state of the software or power source at all.

DETAILED DESCRIPTION OF THE PREFERRED EMBODIMENTS

A first aspect of the invention relates to information transmission between a function expansion device and an information portable terminal device such as notebook PC which is often detached and attached, in which the serial signal converted for optical transmission is transmitted by full duplex by two lines of optical transmission route for spatial optical transmission between an emitter and a receiver disposed oppositely across a spatial gap. Therefore, information can be transmitted without using mechanical connection.

In a second aspect of the invention, the serial signal conforming to the general-purpose high speed data transmission standard, IEEE1394 standard, is converted into a serial signal for optical transmission, and the serial signal for optical transmission is transmitted by full duplex by two lines of optical transmission route for spatial optical transmission between an emitter and a receiver disposed oppositely across a spatial gap. Therefore, serial data of IEEE1394 can be transmitted without making contact.

In a third aspect of the invention, the serial signal conforming to the universal serial bus standard is converted into a serial signal for optical transmission, and the serial signal for optical transmission is transmitted by full duplex by two lines of optical transmission route for spatial optical transmission between an emitter and a receiver disposed oppositely across a spatial gap. Therefore, serial data of USB can be transmitted without making contact.

In a fourth aspect of the invention, the serial signal conforming to the IEEE1394 standard is converted into a serial signal for high speed optical transmission, and the serial signal for high speed optical transmission is transmitted by two lines of high speed optical transmission route having an emitter and a receiver disposed oppositely across a spatial gap, and the serial signal conforming to the universal serial bus standard is converted into a serial signal for medium or low speed optical transmission, and the serial signal for medium or low speed optical transmission is transmitted by two lines of medium or low speed optical transmission route having an emitter and a receiver disposed oppositely across a spatial gap. Therefore, serial data of both IEEE1394 and USB can be transmitted without making contact.

A fifth aspect of the invention consists of two lines, each comprising means for converting the serial signal conforming to the IEEE1394 standard into a serial signal for high speed optical transmission, means for converting the serial signal conforming to the universal serial bus standard into a serial signal for medium or low speed optical transmission, multiplexing means for multiplexing the serial signal for high speed optical transmission and the serial signal for medium or low speed optical transmission, a high speed optical transmission route for spatial transmission of the output of the multiplexing means by an emitter and a receiver disposed oppositely across a spatial gap, demultiplexing means for demultiplexing the signal transmitted through the high speed optical transmission route, means for reproducing one of the demultiplexing means into a serial signal conforming to the is IEEE1394 standard, and means for reproducing the other of the demultiplexing means into a serial signal conforming to the universal serial bus standard. Therefore, serial data of both IEEE1394 and USB can be multiplexed and transmitted without making contact.

A sixth aspect of the invention consists of two lines, each comprising means for converting the serial signal into a serial signal for optical transmission, a switcher for receiving the serial signal for optical transmission and selecting an output, first transmitting means for transmitting one output of the switcher to an emitter and a receiver disposed oppositely across a spatial gap, and second transmitting means for transmitting the other output of the switcher through an optical fiber cable, in which the switcher issues its output to the second transmitting means side when it is possible to transmit by the second transmitting means. Therefore, the method of transmission can be selected depending on whether a short distance or a long distance.

A seventh aspect of the invention comprises an AC/AC converter for AC/AC conversion of commercial power source, and a first spatial transmission core for transmitting the output power of the AC/AC converter through a spatial gap, provided at one of devices disposed across a spatial gap, and a second spatial transmission core for receiving the electric power from the first spatial transmission core, and an AC/DC converter for feeding the electric power from the second spatial transmission core into the device as direct current, provided at other one of the devices disposed across a spatial gap. Therefore, together with information transmission, electric power can be also transmitted without making contact.

Referring now to the drawings, embodiments of the invention are described below.

Embodiment 1

Figure 1:
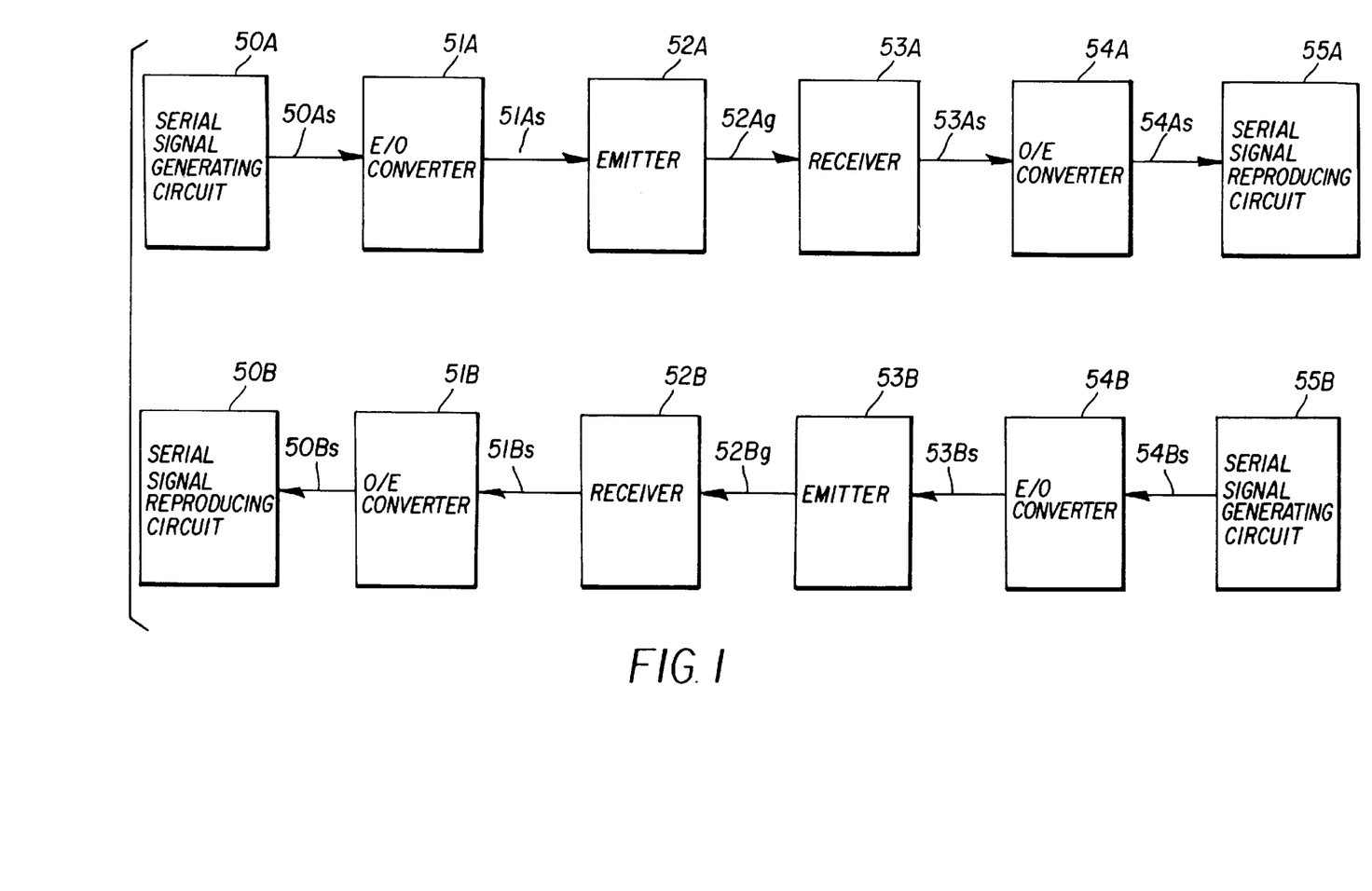
FIG. 1 is a block diagram showing a noncontact information transmitter in accordance with a first embodiment of the invention.

FIG. 1 is a block diagram showing a constitution of a noncontact information transmitter according to embodiment 1 of the invention. This embodiment is intended to convert the serial signal into an optical signal, and transmit in a spatial gap, and full duplex transmission is conducted by two lines of signals.

In FIG. 1, the constitution comprises electric signal/optical signal converters (E/O converters) 51A, 54B for converting the amplitude and waveform of serial electric signals 50As, 54Bs issued from serial signal generating circuits 50A, 55B into signals suited to specified emission and reception (hereinafter called optical signals), emitters 52A, 53B composed of light emitting diodes and others, receivers 53A, 52B composed of photo diodes and others opposite to the emitters 52A, 53B across a spatial gap (gap distance) of 10 mm −10 mm/+5 mm, optical signal/electric signal converters (O/E converters) 54A, 51B, and serial signal reproducing circuits 55A, 50B.

The light emitting devices are controlled in the radiation angle of 30 degrees or less, preferably 10 degrees or less, in order to enhance the luminance, and the light receiving devices are composed of focusing lens in order to enhance the sensitivity, and the spatial gap between the emitter and the receiver is preferably 10 mm −10 mm/+5 mm, but the spatial gap may be expanded depending on the characteristic of the emitter and receiver.

Herein, the signals 50As, 54Bs are serial data signals of, for example, 400 Mbps, and are passed through the E/O converters 51A, 54B to be converted into optical signals determined in the amplitude and waveform so that the receivers 53A and 52B may operate normally. The emitters 52A, 53B convert these signals 51As, 53Bs into optical signals 52Ag, 52Bg. The emitters 52A, 53B and receivers 53A, 52B are of high reliability with the transmission error rate of 10 exp(−12) bits or more in a range of, for example, 10 mm −10 mm/+5 mm. Outputs 53As, 51Bs of the receivers 53A, 52B are shaped into accurate digital waveforms by the O/E converters 54A, 51B, and transmitted into the serial signal reproducing circuits 55A, 50B. Serial electric signals 50As, 54Bs generated from the serial signal generating circuits 50A, 55B are delayed from the serial electric signals 54As, 50Bs generated from the O/E converters 54A, 51B by delay time t nsec, but the signals coincide completely. At this time, the delay time t is the sum of delay time occurring in the E/O converters 51A, 54B, transmission routes 51As, 53Bs, emitters 52A, 53B, spatial gap transmission routes 52Ag, 52Bg, receivers 53A, 52B, transmission routes 53As, 51Bs, and O/E converters 54A, 51B.

Thus, according to the embodiment, since the serial data signal is transmitted optically through the spatial gap, mechanical connector is not used, so that the life of connection times can be substantially improved.

Moreover, as compared with the mechanical connection, optical connection is effective to reduce the undesired interference. Besides, in the case of mechanical connector, information processing device or function expansion device composed of semiconductor elements susceptible to surge voltage may be broken or malfunction by application of static electricity or spark voltage, but such breakdown or malfunction may be prevented by optical connection. In the case of optical connection, the connector can be treated to shut off salt, moisture or dirt, and the reliability and life are notably improved.

Embodiment 2

Figure 2:
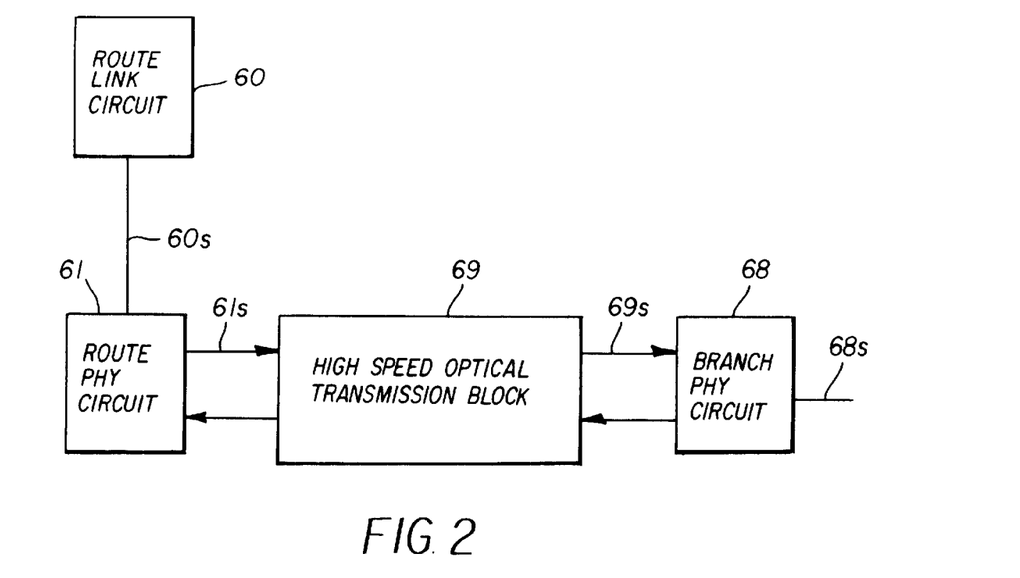
FIG. 2 is a block diagram showing a noncontact information transmitter in accordance with a second embodiment of the invention.

FIG. 2 is a block diagram showing a constitution of a noncontact information transmitter according to embodiment 2 of the invention. In this embodiment, IEEE1394 is used as serial signal.

First, the specification and features of the IEEE1394 are briefly described. The IEEE1394 standard includes the IEEE1394-1995 and IEEE1394.a specifications. These specifications were determined by P1394 (Project 1394), and the IEEE1394-1995 is the standard of the twisted pair (electric signal) transmission route supporting the transmission speed of 100 Mbps, 200 Mbps, and 400 Mbps stipulated in 1995, and the IEEE1394.a is a revised standard of the IEEE1394-1995. Hereinafter, these two standards are called collectively the 1394.X.

The internal constitution of the 1394.X is divided into the upper link layer circuit (hereinafter LINK circuit) and the lower physical layer circuit (PHY circuit). As shown in FIG. 2, the constitution comprises a route LINK circuit 60, a route PHY circuit 61, a high speed optical transmission block 69, and a branch PHY circuit 68. The internal constitution of the high speed optical transmission route 69 is same as the transmitter of two lines shown in FIG. 1, and the following description is made by reference to FIG. 1.

The operation is briefly described below. A parallel signal 60s issued from the route LINK circuit 60 gives data and command to the route PHY circuit 61. This signal is, in the route PHY circuit 61, converted into a serial signal 61s of, for example, 400 Mbps. The serial signal generating circuit 50A performs, for example, 8B10B conversion to convert 8-bit data into 10-bit data in order to avoid consecutive same codes. Consecutive same codes must be avoided because the light can transmit only AC components. Since the 8-bit data is increased to 10-bit data, the E/O circuit output signal 51As is 500 Mbps. Accordingly, the emitter 52A transmits 500 Mbps. The spatial gap 52g has the reliability of transmission error rate of 10 exp (−12) bits or more in a range of, for example, 10 mm −10 mm/+5 mm. The output 53As of the receiver 53A is a signal of 500 Mbps. The serial signal reproducing circuit 55A decreases from 10 bits to 8 bits by 10B8B conversion reversely to 8B10B conversion, and an accurate digital signal 55As of 400 Mbps is obtained, which is transmitted to the branch PHY circuit 68.

The output signal 68s of the branch PHY circuit 68 is delayed from the signal 61s issued from the route PHY circuit 61 by delay time t nsec, but the signals coincide completely. The delay time t at this time is the sum of delay time in the circuits and transmission route from the high speed optical transmission block 69 (serial signal generating circuit 50A) to the branch PHY circuit 68. The signal from the branch PHY circuit 68 to the PHY circuit 61 is transmitted similarly in the route of the other completely reverse line, and the detail is omitted.

Thus, according to the embodiment, since the serial data of IEEE1394 is transmitted without resort to mechanical connector, transmission regardless of the connector detaching and attaching life is realized.

Embodiment 3

Figure 3:
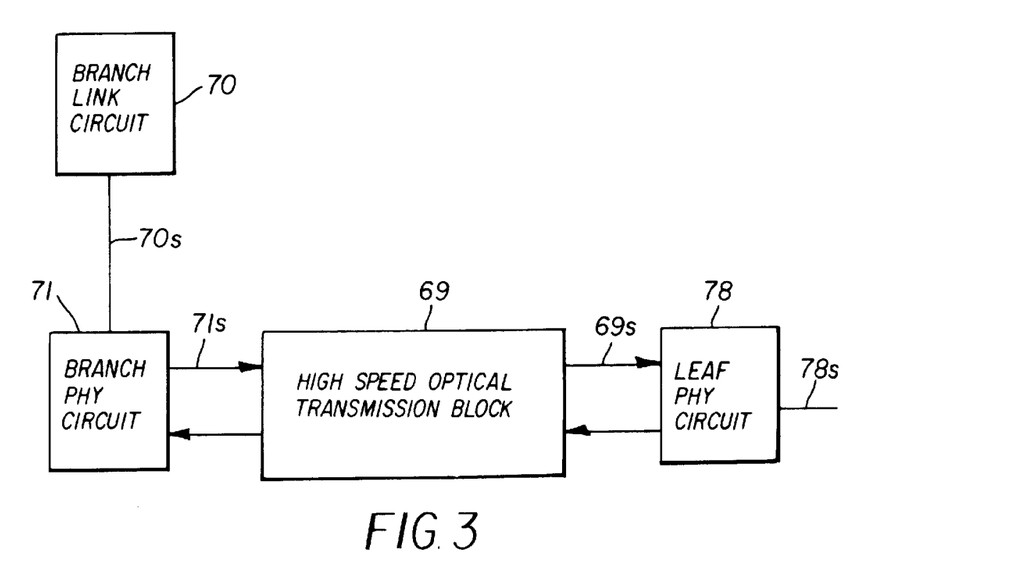
FIG. 3 is a block diagram showing a noncontact information transmitter in accordance with a third embodiment of the invention.

FIG. 3 is a block diagram showing a constitution of a noncontact information transmitter according to embodiment 3 of the invention. As compared with the transmission between the route and branch in the example shown in FIG. 2, the example shown in FIG. 3 is the transmission between the branch and leaf. Hence it is the same as embodiment 2 except that the route is replaced by branch, and the branch by the leaf.

Hence, as shown in FIG. 3, the constitution comprises a branch LINK circuit 70, a branch PHY circuit 71, a high speed optical transmission block 69, and a leaf PHY circuit 78. The operation is briefly described below.

A signal 70s issued from the branch LINK circuit 70 gives data and command to the branch PHY circuit 71. The signal is converted into a serial signal 71s of, for example, 400 Mbps in the branch PHY circuit 71. The internal operation of the high speed optical transmission block 69 is same as in embodiment 2, and the detail is omitted. The output of the high speed optical transmission block 69 is an accurate digital signal 69s of 400 Mbps, and is transmitted to the leaf PHY circuit 78. The output signal 78s of the leaf PHY circuit 78 is delayed from the signal 71s issued from the branch PHY circuit 71 by delay time t nsec, but the signals coincide completely. The delay time t at this time is the sum of delay time in the circuits and transmission route from the high speed optical transmission block 69 to the leaf PHY circuit 78. The signal from the leaf PHY circuit 78 to the branch PHY circuit 71 is transmitted similarly in the route of the other completely reverse line, and the detail is omitted.

Thus, the embodiment can be executed also between the branch and leaf of the IEEE1394, and the same effects as in embodiment 2 are obtained.

Embodiment 4

Figure 4:
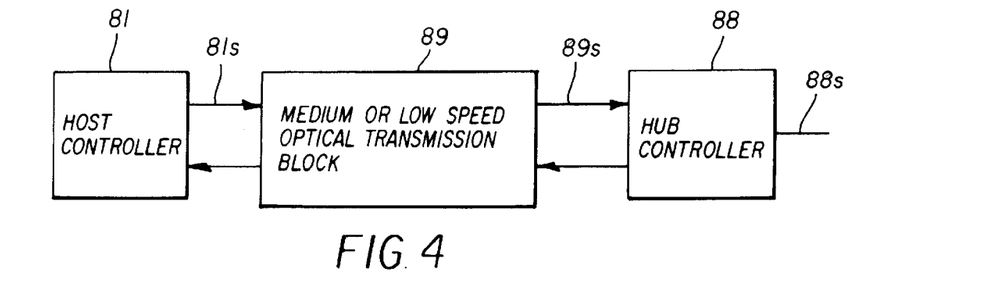
FIG. 4 is a block diagram showing a constitution of a noncontact information transmitter in accordance with a fourth embodiment of the invention.

FIG. 4 is a block diagram showing a constitution of a noncontact information transmitter according to embodiment 4 of the invention. FIG. 4 shows the constitution of spatial optical transmission of the physical layer between the host controller and hub controller of the USB.

The embodiment in FIG. 4 is realized by a host controller 81 of USB, a medium or low speed optical transmission block 89, and a hub controller 88. The medium or low speed optical transmission block 89 is a transmitter of two lines same as in FIG. 1, and the following description is made by reference to FIG. 1.

The operation is briefly described below. The host controller 81 issues a serial signal 81s of USB. It is then converted into a same code noncontinuous signal 50As suited to optical transmission in the serial signal generating circuit 50A in the medium or low speed optical transmission block 89. This signal is transmitted to the medium or low speed E/O converter 51A and emitter 52A. The spatial gap 52Ag has a high transmission reliability of transmission error rate of 10 exp (−12) bits or more in a gap range of, for example, 10 mm −10 mm/+5 mm. The medium or low speed receiver 53A receives the optical signal, which is transmitted to the medium or low speed serial signal reproducing circuit 55A through the medium or low speed O/E converter 54A, and further transmitted to the hub controller 88.

The signal 89s entering the hub controller 88 is delayed from the output signal 81s of the host controller 81 by the delay time occurring in the medium or low speed optical transmission block 89, but the signals coincide completely. The signal from the hub controller 88 to the host controller 81 is transmitted similarly in the route of the other completely reverse line, and the detail is omitted.

Thus, according to the embodiment, since the serial data of USB is transmitted without resort to mechanical connector, transmission regardless of the connector detaching and attaching life is realized.

Figure 5:
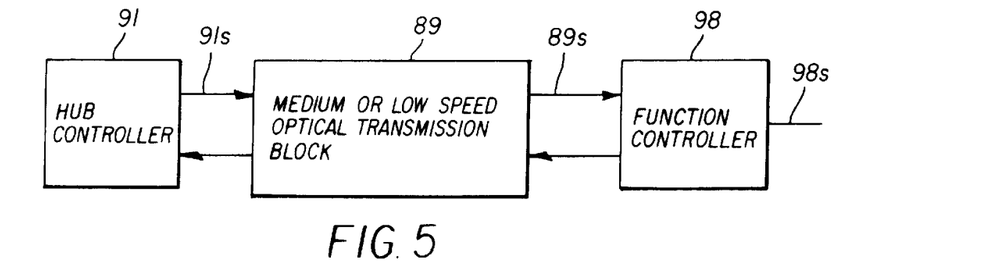
FIG. 5 is a block diagram showing other constitution of the noncontact information transmitter in the fourth embodiment.
Figure 6:
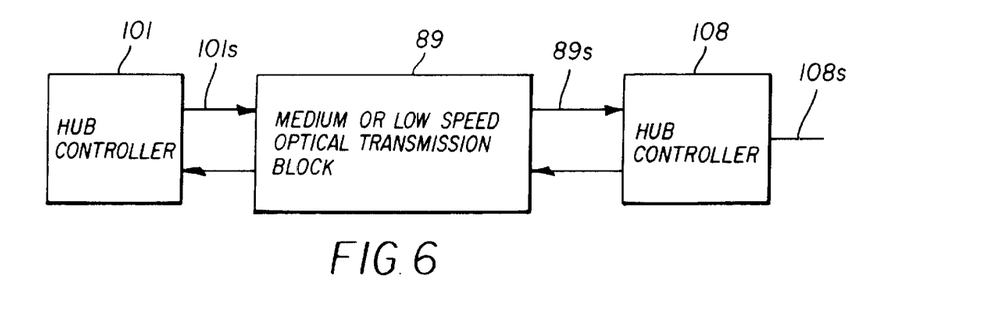
FIG. 6 is a block diagram showing a different constitution of the noncontact information transmitter in the fourth embodiment of the invention.

In the embodiment, noncontact optical transmission connection between the host controller 81 and hub controller 88 is shown, but, alternatively, the hub controller and function controller may be connected, or two hub controllers may be connected. Such examples are shown in FIGS. 5 and 6. In FIGS. 5 and 6, through the medium or low speed optical transmission block of noncontact connection shown in FIG. 4, serial data of USB can be transmitted by full duplex between a hub controller 91 and a function controller 98, or between a hub controller 101 and a hub controller 108.

Embodiment 5

Figure 7:
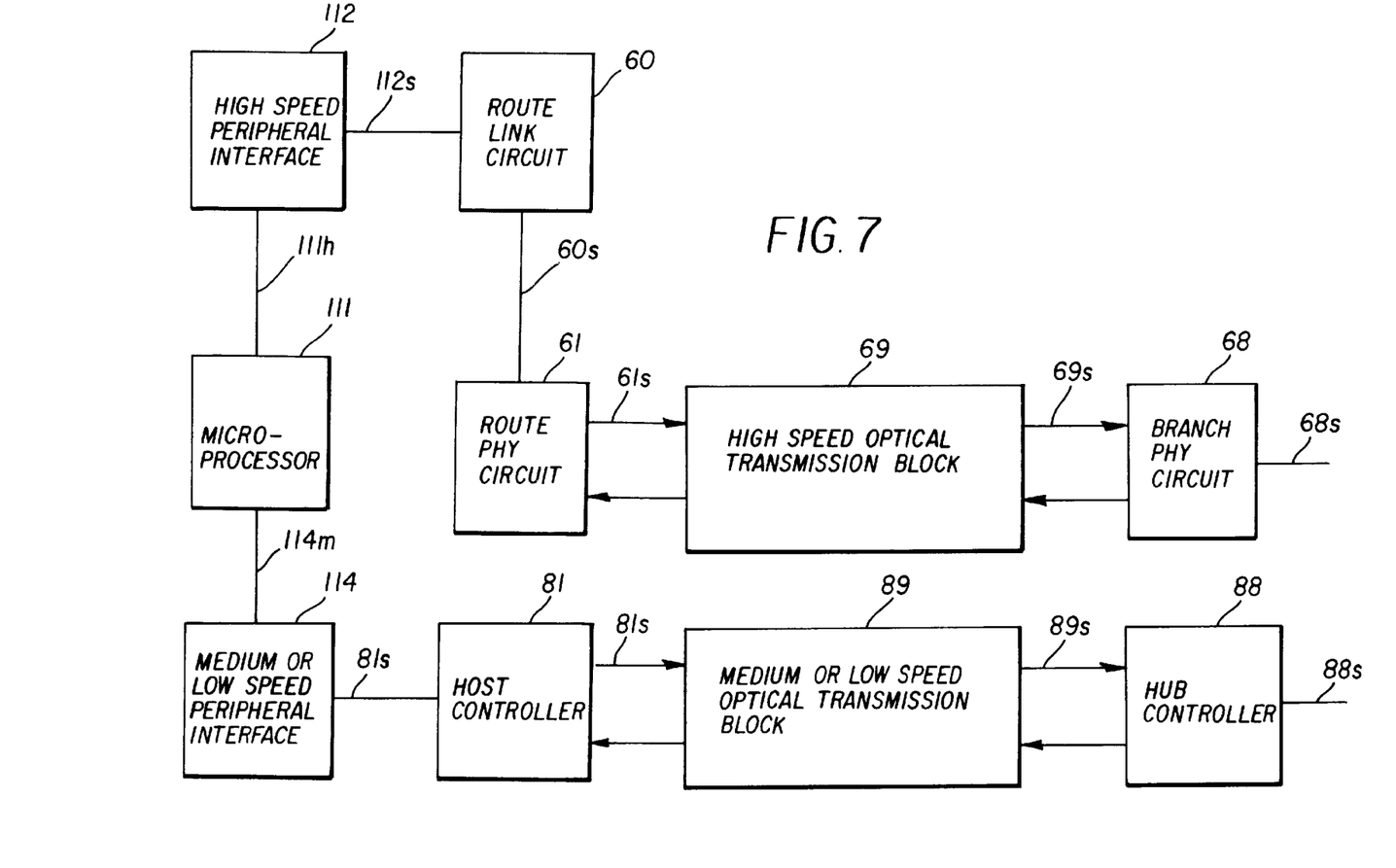
FIG. 7 is a block diagram showing a noncontact information transmitter in accordance with a fifth embodiment of the invention.

FIG. 7 is a block diagram showing a constitution of a noncontact information transmitter according to embodiment 5 of the invention. This embodiment is a combination of embodiment 2 (FIG. 2) of transmission by IEEE1394 and embodiment 4 (FIG. 4) of transmission by USB.

The transmitter shown in FIG. 7 comprises a microprocessor 111, a high speed peripheral interface circuit 112, the transmitter composed of route LINK circuit 60 to branch PHY circuit 68 shown in embodiment 2 (hereinafter called route-branch high speed optical transmission route), a medium or low speed peripheral interface circuit 114, and the transmitter composed of host controller 81 to hub controller 88 shown in embodiment 4 (hereinafter called the host controller-hub controller medium or low speed transmission route). Part of the operation is described briefly below.

A high speed signal 111h corresponding to transmission speed of 400 Mbps issued from the microprocessor 111 enters the high speed peripheral interface 112, and is further put into the route-branch high speed optical transmission route. The subsequent signal transmission is same as in embodiment 2, and the explanation is omitted.

A medium or low speed signal 114m corresponding to transmission speed of 12 Mbps issued from the microprocessor 111 enters the medium or low speed peripheral interface 114, and is sent into the host controller-hub controller medium or low speed transmission route, and is transmitted same as in embodiment 4.

Thus, according to the embodiment, both high speed serial transmission of IEEE1394 and medium or low speed serial transmission of USB are realized by noncontact connection.

Embodiment 6

Figure 8:
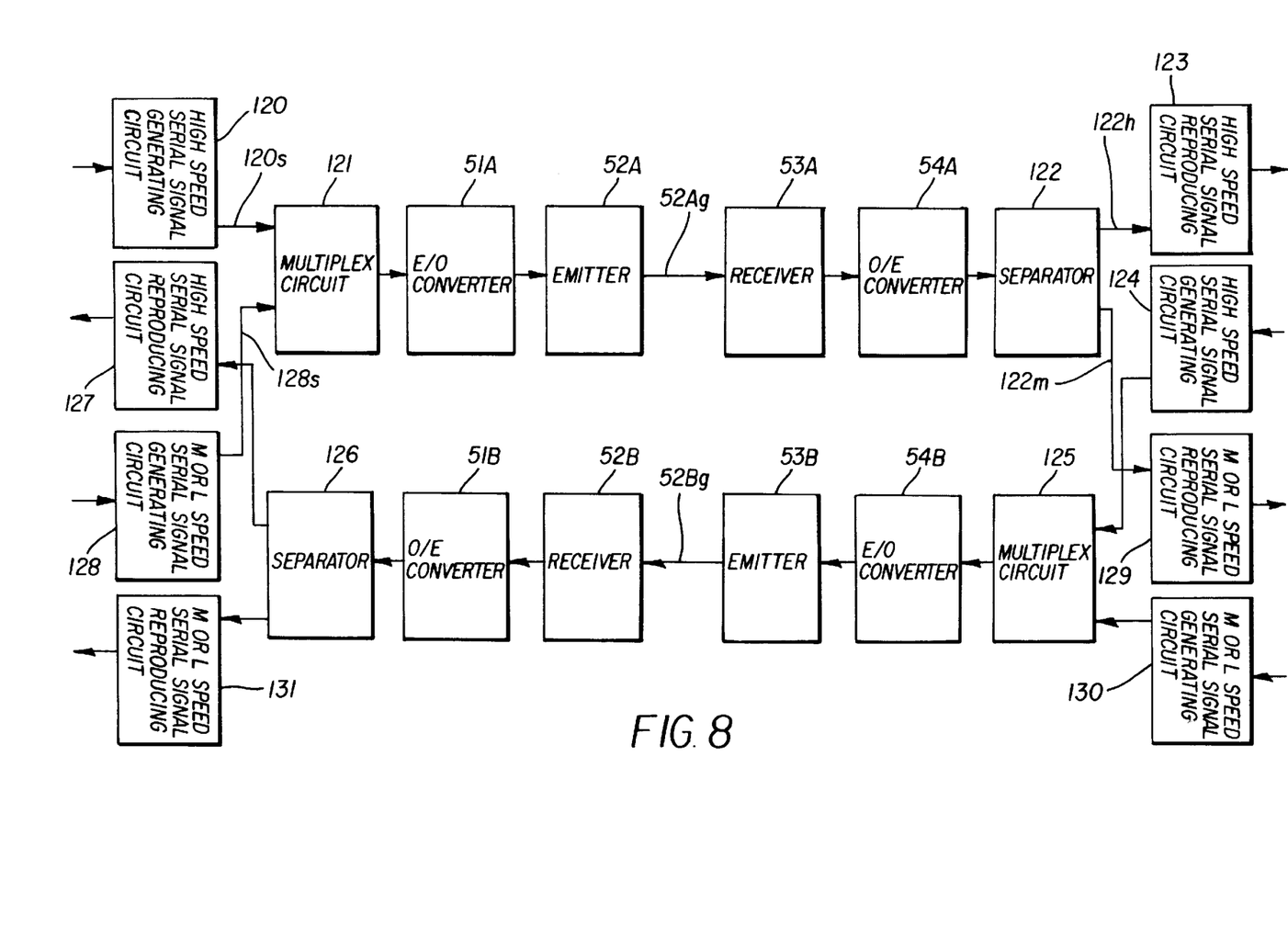
FIG. 8 is a block diagram showing a noncontact information transmitter in accordance with sixth and seventh embodiments.

FIG. 8 is a block diagram showing a constitution of a noncontact information transmitter according to embodiment 6 of the invention. This embodiment relates to spatial transmission by multiplexing the IEEE1394 and USB, and by multiplexing the high speed optical transmission block 69 and medium or low speed optical transmission block 89 shown in FIG. 7, the invention is realized by high speed optical transmission only.

Only the difference from FIG. 7 is described below. As shown in FIG. 8, a multiplex circuit 121 is placed between a high speed serial signal generating circuit 120 and an E/O converter 51A, and between a medium or low speed serial signal generating circuit 128 and the E/O converter 51A, a demultiplexer 122 is placed between an O/E converter 54A and a high speed serial signal reproducing circuit 123, and between the O/E converter 54A and a medium or low speed serial signal reproducing circuit 129, a multiplex circuit 125 is placed between a high speed serial signal generating circuit 124 and an E/O converter 54B, and between a medium or low speed serial signal generating circuit 130 and the E/O converter 54B, and a demultiplexer 126 is placed between an O/E converter 51B and a high speed serial signal reproducing circuit 127, and between the O/E converter 51B and a medium or low speed serial signal reproducing circuit 131. As a result, the high speed optical transmission block 69 and medium or low speed optical transmission block 89 shown in FIG. 7 can be integrated into one body.

The operation is briefly described below. A signal 111h coming out of the microprocessor 111 is given to the route LINK circuit 60 from the high speed peripheral interface 112. A signal 112s entering the route LINK circuit 60 is converted in protocol. An output signal 60s enters the route PHY circuit 61, and is converted in serial, and after arbitration or other processing conforming to the IEEE1394 standard, an output 61s is obtained. This signal 61s is fed into the high speed serial signal generating circuit 120, and is then applied to the multiplex circuit 121 after data width curtailment and encoding process for optical transmission.

Independently thereof, the signal 114m issued from the microprocessor 111 is given to the host controller 81 through the medium or low speed peripheral interface 114. After protocol processing conforming to the USB standard and conversion into serial signal in the host controller 81, the output signal 81s is curtailed in the data width for optical transmission, and it is applied to the multiplex circuit 121 from the medium or low speed serial signal generating circuit 128.

In the multiplex circuit 121, the signal 120s and signal 128s are added. The subsequent signal is given to the demultiplexer 122 through the E/O converter 51A, emitter 52A, receiver 53A, and O/E converter 54A. Herein, the description about the spatial transmission is same as in embodiment 2 or 3, and is hence omitted.

Being demultiplexed into a high speed signal 122h and a medium or low speed signal 122m in the demultiplexer 122, they are respectively given to the high speed serial signal reproducing circuit 123 and medium or low speed serial signal reproducing signal 129. In the high speed serial signal reproducing circuit 123, being converted into a serial signal 69s conforming to the IEEE1394 standard, it is given to the branch PHY circuit 68. On the other hand, the signal 122m given to the medium or low speed serial signal reproducing circuit 129 is converted into a serial signal 89s conforming to the USB standard, and is transmitted to the hub controller 88.

A reverse route is to transmit in the same procedure in the signal route in the lower part of FIG. 8, and the description is omitted.

Thus, according to the embodiment, in addition to the effects of embodiment 5, spatial transmission can be realized by high speed transmission only.

Embodiment 7

As embodiment 7 of the invention, a noncontact information transmitter having the constitution described above disposed in the notebook personal computer and the function expansion device is described below. As the specific constitution used in the explanation, a case of applying the constitution in FIG. 7 into FIG. 8 is assumed.

The left side of the emitter 52A and receiver 52B in FIG. 8 is disposed in the notebook PC, and the right side of the receiver 53A and emitter 53B is disposed in the function expansion device, and it is transmitted by the spatial gap between them.

To the branch PHY circuit 68 at the function expansion device side, a high speed peripheral device conforming to the IEEE1394.X standard is connected, for example, digital VTR, CD-ROM, or hard disk, and to the hub controller 88 at the function expansion side, a medium or low speed peripheral device conforming to the USB standard is connected, for example, printer or digital still camera. The operation is briefly described below.

The constitution and signal flow from the microprocessor 111 to the branch PHY circuit 68 and to hub controller 88 are same as in embodiment 6, and are hence omitted. The branch PHY circuit 68 functions as a repeater to the peripheral device. That is, the PHY circuit 68 merely passes the signal 69s and generates the output signal 68s. Thus, the signal 111h and signal 114m from the microprocessor 111 become optical signals 52Ag, and are transmitted to the high speed peripheral device and medium or low speed peripheral device through the spatial gap, respectively. Herein, the optical signal 52Ag of spatial transmission is a space, and therefore may be connected or disconnected anytime whether during transmission or not.

Assume that the notebook PC and the function expansion device being in a separate state are placed at a distance of a spatial gap of 10 mm −10 mm/+5 mm. While the notebook PC and the function expansion device are remote from each other, optical signals 52Ag and 52Bg are emitted from the emitters 52A and 53B, respectively. However, the optical signal 52Ag and optical signal 52Bg do not reach the receivers 53A, 52B, and it is judged that the microprocessor 111 and each peripheral device are not connected with each other.

Next, when the notebook PC and the function expansion device are placed at a distance of a spatial gap of 10 mm −10 mm/+5 mm, the receivers 53A, 52B receive the optical signals 52Ag, 52Bg correctly, and it is judged that the microprocessor 111 and each peripheral device are connected respectively. After connection, the microprocessor 111 and each peripheral device continue transmission in the procedure determined in the IEEE1394.X or USB. If a transmission error occurs, error detection and re-transmission and reception will be carried out in the procedure determined in the IEEE1394.X and USB.

Finally, whether during transmission or not, when the notebook PC and function expansion device are cut off and separated in a space of 10 mm −10 mm/+5 mm, if optical signals 52Ag, 52Bg are emitted from the emitters 52A, 52B, respectively, the optical signals 52Ag, 52Bg do not reach up to the receivers 53A, 52B, and therefore it is judged that the microprocessor 111 and each peripheral device are not connected with each other, and transmission and reception are stopped.

Thus, according to the embodiment, in the standard of IEEE1394 and USB, data transmission or reception can be connected or disconnected without being conscious of the state of the power source or software. Moreover, since the data can be transmitted without making contact, lowering of reliability due to connection or disconnection can be prevented.

Embodiment 8

Figure 9:
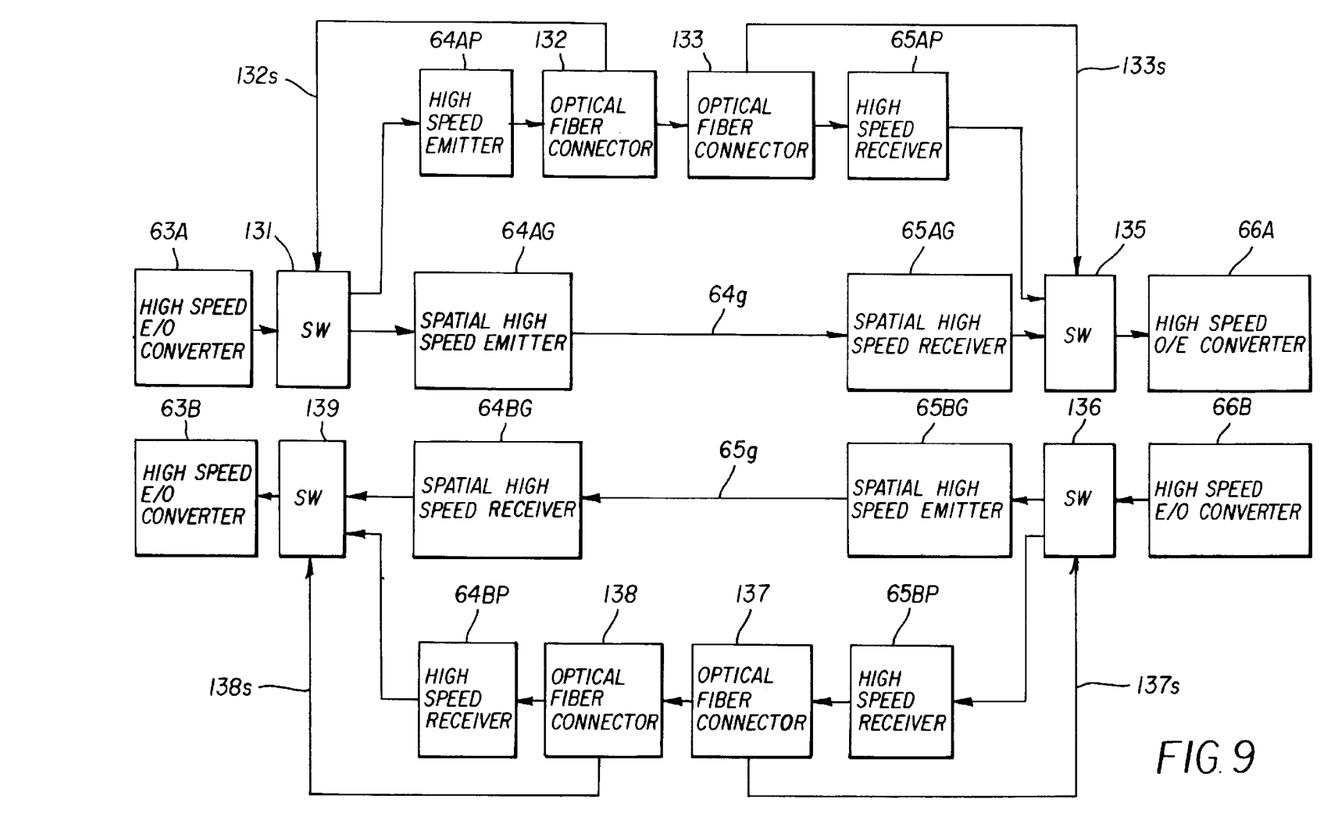
FIG. 9 is a block diagram showing a noncontact information transmitter in accordance with an eight embodiment of the invention.

FIG. 9 is a block diagram showing a constitution of a noncontact information transmitter according to embodiment 8 of the invention. This embodiment relates to a notebook PC and a function expansion device having both spatial optical transmission and optical fiber cable transmission. Therefore, this embodiment is realized by adding the emitter and receiver for optical fiber cable to embodiment 7. The constitution is described below while referring to FIG. 9.

Only the portion different from FIG. 8 is described below. In the next stage of the high speed E/O converter 63A (E/O converter 51A in FIG. 8), a switcher (SW) 131 for switching the output by a signal 132s from an optical fiber connector 132, and a switcher (SW) 135 for switching the input by a signal 133s from the high speed emitter 64AP for optical fiber, optical fiber connector 132, optical fiber connector 133 for reception side, high speed receiver 65AP, and optical fiber connector 133 are added.

In the next stage of the high speed E/O converter 66B (E/O converter 54B in FIG. 8), a switcher (SW) 136 for switching the output by a signal 137s from an optical fiber connector 137, and a switcher (SW) 139 for switching the input by a signal 138s from the high speed emitter 65BP for optical fiber, optical fiber connector 137, optical fiber connector 138 for reception side, high speed receiver 64BP, and optical fiber connector 138 are added. Spatial high speed emitters 64AG, 65BG and spatial high speed receivers 65AG, 64BG correspond respectively to the emitters 52A, 53B and receivers 53A, 52B in FIG. 8.

The operation is briefly described. While optical fiber connector is not connected to the notebook PC 10 and function expansion device 20, the signal flow and operating principle are same as in embodiment 7, and are hence omitted. When the optical fiber connector is connected to the notebook PC 10 and function expansion device 20, the switchers 131, 135, 136, 139 are connected to the optical fiber connection side by means of the signals 132s, 133s, 137s, 138s coming out from the optical fiber connector. Therefore, the signal from the high speed E/O converter 63A is sent to the optical fiber side by the switcher 131, transmitted to the high speed emitter 64AP, sent into the optical fiber connector 133 and high speed receiver 65AP from the optical fiber connector 132 through the optical fiber, and is transmitted to the high speed O/E converter 66A through the switcher 135. The signal transmission from the high speed E/O converter 66B to the high speed O/E converter 63B is the reverse procedure, and the description is omitted.

Thus, without optical fiber, signals are transmitted between the notebook PC 10 and function expansion device 20 in the spatial gap, and when the optical fiber is connected, a long-distance transmission is enabled between the notebook PC 10 and function expansion device 20 by means of an optical fiber. More specifically, when the notebook PC 10 and function expansion device 20 are at a distance of 10 mm −10 mm/+5 mm, it is spatial gap transmission, and at 50 m to 100 m, it is optical fiber transmission.

Embodiment 9

Figure 10:
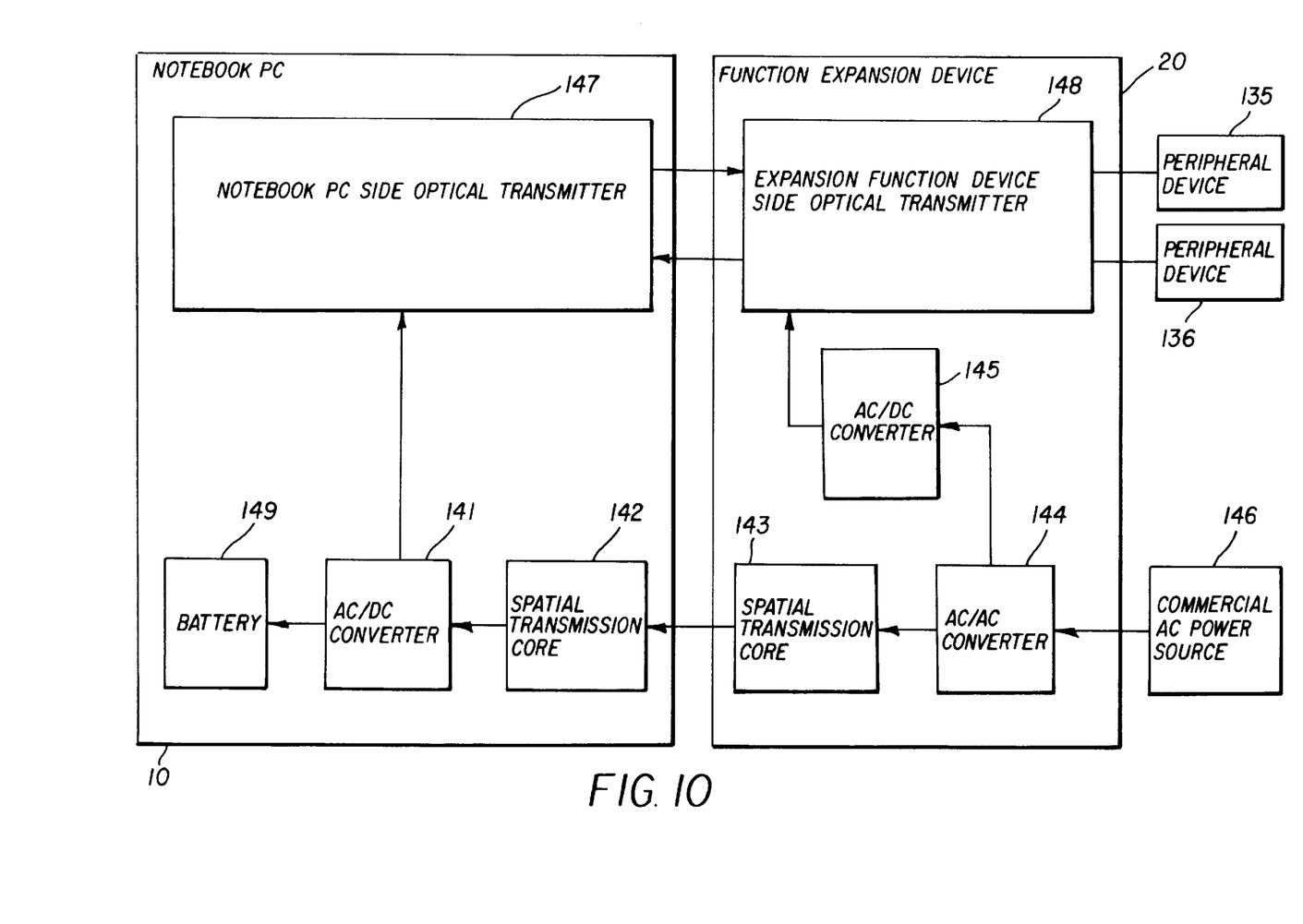
FIG. 10 is a block diagram showing a noncontact information transmitter in accordance with a ninth embodiment of the invention.

FIG. 10 is a block diagram showing a constitution of a noncontact information transmitter according to embodiment 9 of the invention. This embodiment relates to transmission of electric power in the case of noncontact connection between a notebook PC or other information appliance and a function expansion device.

In FIG. 10, reference numeral 147 is a notebook PC side optical transmitter showing the left side portion from the emitter 52A and receiver 52B in FIG. 8, and 148 is a expansion function device side optical transmitter showing the right side portion from the receiver 53A and emitter 53B in FIG. 8. Inside the notebook PC 10, an AC/DC converter 141 for feeding DC power source and a spatial transmission core 142 are provided, and inside the function expansion device 20 there is a spatial transmission core 143 disposed at a spatial distance of 10 mm −10 mm/+5 mm from the spatial transmission core 142, and also an AC/AC converter 144, and an AC/DC converter 145 for producing power source to be supplied into the function expansion device 20 are provided. The AC/AC converter 144 is connected to an external commercial AC power source 146.

The operation is described below. The electric power supplied from the commercial AC power source 146 is converted into alternating current of, for example, 500 kHz by the AC/AC converter 144, and the electric power is transmitted to the spatial transmission core 142 from the spatial transmission core 143 through the spatial gap. At this time, the electric power transmission efficiency is 70% or more at the maximum load, and the power is converted to DC power source by the AC/DC converter 141, and is supplied into the circuit and devices such as the notebook PC side optical transmitter and others in the notebook PC 10.

Connection and disconnection of the notebook PC 10 and function expansion device 20 are described below.

Suppose the notebook PC 10 and function expansion device 20 set apart are placed at a distance of a spatial gap of 10 mm −10 mm/+5 mm. While the notebook PC 10 and function expansion device 20 are set apart, optical signals 52Ag, 52Bg are emitted from the emitter 52A and emitter 53B.

Inside the function expansion device 20, the electric power from the AC/DC converter 145 is supplied into the expansion function device side optical transmitter 148. In the notebook PC side optical transmitter 147, however, electric power is not supplied, and hence optical transmission does not occur.

Next, when the notebook PC 10 and function expansion device 20 are placed at a distance of spatial gap of 10 mm −10 mm/+5 mm, electric power is transmitted from the spatial transmission core 143 to the spatial transmission core 142, and electric power is supplied to the notebook PC side optical transmitter 147 through the AC/DC converter 141. Thereafter, the operation is same as in the foregoing embodiments and the description is omitted.

Finally, whether during transmission or not, when the notebook PC 10 and function expansion device 20 are cut off and the spatial gap is more than 10 mm −10 mm/+5 mm, electric power is not supplied to the notebook PC side optical transmitter 147, and hence the connection is cut off.

Usually, a battery 149 is incorporated in the notebook PC 10, and therefore when the operation of the notebook PC is continued, the electric power from the battery 149 is immediately supplied without break.

Thus, according to the embodiment, electric power can be also transmitted through the spatial gap, and the device can be attached or detached without being conscious of the control of power source. Also according to the embodiment, only at the time of noncontact connection, the electric power is supplied only when connected to the necessary notebook PC side transmitter, so that the power consumption is saved when used in the notebook PC alone.

Effects of the Invention

As described herein, the invention realizes spatial connection by light and electromagnetic wave, without mechanical contact, as compared with the prior art, and is hence semipermanent in the life of insertion and pulling out, and excellent in reliability in high humidity environment, salty environment or dusty environment, and further stable in connection or disconnection, while power source is supplied, between the notebook PC and function expansion device.

What is claimed is:

1. A noncontact information transmitter comprising:
    a first transmitter side including a first emitter and a first receiver;
    a second transmitter side including a second emitter and a second receiver;
    wherein the first emitter transmits a first optical signal to the second receiver across a spatial gap of 0–15 mm and the second emitter transmits a second optical signal to the first receiver across the spatial gap, and
    wherein the first optical signal and the second optical signal each comprise a serial signal conforming to one of the USB and IEEE 1394 standards, and full duplex transmission is accomplished between the first transmitter side and the second transmitter side.

2. The noncontact information transmitter recited in claim 1, wherein the serial signal conforms to the IEEE1394 standard.

3. The noncontact information transmitter as recited in claim 2 further comprising,
    a route physical layer circuit coupled to the first transmitter side; and
    a branch physical layer circuit coupled to the second transmitter side;
    wherein noncontact transmission is realized between the route physical layer circuit and the branch physical layer circuit.

4. The noncontact information transmitter as recited in claim 2 further comprising,
    a branch physical layer circuit coupled to the first transmitter side; and
    a leaf physical layer circuit coupled to the second transmitter side;
    wherein noncontact transmission is realized between the branch physical layer circuit and the leaf physical layer circuit.

5. The noncontact information transmitter recited in claim 1, wherein the serial signal conforms to the USB standard.

6. The noncontact information transmitter of claim 5, wherein noncontact transmission is realized between at least one of a host controller circuit coupled to the first transmitter side and a hub controller circuit coupled to the second transmitter side, a hub controller circuit coupled to the first transmitter side and a function circuit coupled to the second transmitter side, and a first hub controller circuit coupled to the first transmitter side and a second hub controller circuit coupled to the second transmitter side.

7. A noncontact information transmitter of claim 1, wherein the first transmission side is provided in an information processing device, and the second transmission side is provided in a function expansion device of said information processing device.

8. A noncontact information transmitter comprising:

a first speed optical transmission block comprising a first transmitter side including a first emitter and a first receiver, and a second transmitter side including a second emitter and a second receiver; wherein the first emitter transmits a first optical signal to the second receiver across a spatial gap of 0– . mm and the second emitter transmits a second optical signal to the first receiver across the spatial gap, and wherein the first optical signal and the second optical signal each comprise a serial signal conforming to one of the USB and IEEE 1394 standards, and full duplex transmission is accomplished between the first transmitter side and the second transmitter side; and a second speed optical transmission block, having a lower transmission speed than said first speed optical transmission block, including a first transmitter side including a first emitter and a first receiver, and a second transmitter side including a second emitter and a second receiver; wherein the first emitter transmits a first optical signal to the second receiver across a spatial gap of 0–15 mm and the second emitter transmits a second optic al signal to the first receiver across the spatial gap, wherein the first optical signal and the second optical signal each comprise a serial signal conforming to one of the USB and IEEE1394 standards, and full duplex transmission is accomplished between the first transmitter side and the second transmitter sided.

* * * * *